United States Patent

Maeda et al.

[11] Patent Number: 6,028,833
[45] Date of Patent: Feb. 22, 2000

[54] OPTICAL DISK SIGNAL PROCESSING APPARATUS USING MODULATED LIGHT SOURCE IN A PLAYBACK OPERATION

[75] Inventors: Takeshi Maeda, Kokubunji; Hisataka Sugiyama, Kodaira, both of Japan

[73] Assignee: Hitachi, Ltd., Tokyo, Japan

[21] Appl. No.: 08/708,721

[22] Filed: Sep. 5, 1996

[30] Foreign Application Priority Data

Sep. 6, 1995 [JP] Japan .................................. 7-229314

[51] Int. Cl.$^7$ ...................................................... G11B 7/00
[52] U.S. Cl. .......................................... 369/116; 369/124
[58] Field of Search ................................... 369/116, 124, 369/59, 47, 48, 50, 54, 58

[56] References Cited

U.S. PATENT DOCUMENTS

| | | | |
|---|---|---|---|
| 4,480,325 | 10/1984 | Aiki et al. . | |
| 5,126,994 | 6/1992 | Ogawa et al. | 369/116 |
| 5,172,352 | 12/1992 | Kobayashi | 369/116 X |
| 5,216,660 | 6/1993 | Iimura | 369/116 |
| 5,446,716 | 8/1995 | Eastman et al. | 369/116 X |
| 5,493,549 | 2/1996 | Miyazawa | 369/116 X |
| 5,559,785 | 9/1996 | Honda et al. | 369/116 X |
| 5,600,612 | 2/1997 | Saito et al. | 369/116 X |

FOREIGN PATENT DOCUMENTS 4-325924 11/1992 Japan .
4-325948 11/1992 Japan .

*Primary Examiner*—Paul W. Huber
*Attorney, Agent, or Firm*—Beall Law Offices

[57] ABSTRACT

An optical disk signal processing apparatus retains compatibility with the conventional continuous servo recording technique, and reduces the amount of noise included in a signal played back from the optical disk without the need to decrease the size of the area for recording data, resulting in a drastically increased signal-to-noise ratio. The optical disk signal processing apparatus has a light source, an optical system for leading a light beam generated by the light source, an optical device for converging the light beam output by the optical system and applying the converged beam to the rotating optical disk, a signal detecting optical system for detecting a signal reflected by the rotating disk through the optical device, and a light detecting instrument for converting light produced by the signal detecting optical system into an electrical signal and a data detecting circuit. The intensity of the beam radiated by the light source is modulated by a modulation circuit in synchronism with data detection timing so that a playback signal having an improved signal-to-noise ratio can be obtained by integrating a product of a response waveform signal generated by a light beam reflected from an information mark and a light-intensity modulating signal over a fixed period of time.

4 Claims, 5 Drawing Sheets

RESPONSE FROM A 0.38-MICRON UNIT MARK

FIG. 5(b)
FIG. 5(c)
FIG. 5(d) RECORDING MARKS 
FIG. 5(e) DETECTION SIGNAL 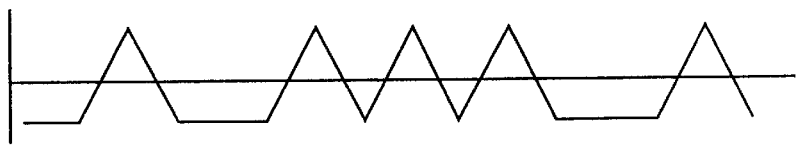
FIG. 5(f) CLOCK PULSE 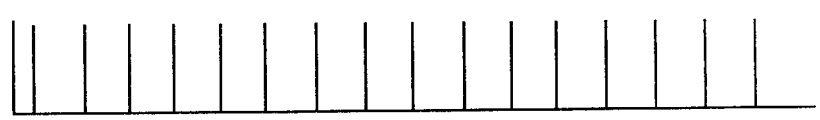
FIG. 5(g) CHARGING/DISCHARGING SWITCHING SIGNAL 
FIG. 5(h) CHARGING START SIGNAL 
FIG. 5(i) DISCHARGING END SIGNAL 
FIG. 5(j) DIRECT-CURRENT LEVEL 
FIG. 5(k) INTEGRATION TIMING SIGNAL 

OPTICAL DISK SIGNAL PROCESSING APPARATUS USING MODULATED LIGHT SOURCE IN A PLAYBACK OPERATION

BACKGROUND OF THE INVENTION

1. Field of the Invention

In general, the present invention relates to an apparatus for optically recording and playing back information into and from a disk. In particular, the present invention relates to signal processing by an optical disk apparatus.

2. Description of the Related Art

In the conventional optical disk apparatus, during a playback operation, a light beam having a fixed intensity is radiated from a light source. The light is reflected by a disk with a reflection intensity that varies due to an optical interference effect between light spots formed on the disk by the light beam, and marks on the disk that represent information stored on the disk. The reflected light is received and converted into an electrical signal to be detected and output later.

In this system, the playback electrical signal includes disk noise, laser noise, amplifier noise, and other kinds of noise which inevitably affect the accuracy of the detection of the electrical signal. The effects of the shot noise and the amplifier noise can be reduced effectively by increasing the power of the radiated light. By merely increasing the power of the radiated light, however, the temperature of an area on the disk hit by the radiating light beam increases, inevitably damaging the mark representing information stored on the disk.

In addition, a disk has been proposed which, when manufactured, includes marks that introduce timing information for recording purposes. The timing information is then used for recording information marks on the surface of the disk at predetermined locations.

In a playback operation, pulses radiated by using the timing information as a base are received. In this system, however, marks must be created on the disk in advance at locations at predetermined intervals, making it necessary to divide the region for recording information by the marks provided thereon. As a result, the disk is incompatible with disks manufactured by the conventional technique whereby data are recorded in a contiguous area. Further, the size of the recording area decreases because of the created marks.

SUMMARY OF THE INVENTION

The present invention provides a signal processing apparatus that retains compatibility with the conventional continuous servo recording technique, and reduces the amount of noise included in a signal played back from the optical disk, which noise has been a difficult problem for the conventional playback method, without the need to decrease the size of the area for recording data, resulting in a drastically increased signal-to-noise ratio.

The optical disk signal processing apparatus of the present invention employs a light source, an optical system for leading a beam generated by the light source, an optical device for converging the beam output by the rotating system and applying the converged beam to the rotating disk, a signal detecting optical system for detecting a signal reflected by the rotating disk through the optical device, a light detecting instrument for converting light produced by the signal detecting optical system into an electrical signal, and a data detecting circuit. The intensity of the beam radiated by the light source is modulated in synchronism with the timing of data detection so that a playback signal having an improved signal-to-noise ratio can be obtained by integrating the product of a response waveform signal generated by a light beam reflected from an information mark and a light-intensity modulating signal over a fixed period of time.

By providing a correlation between the information mark and the intensity modulation, the intensity of the signal coming from the information mark can be increased and, at the same time, noise not correlated with the light-intensity modulating signal can be suppressed. As a result, the signal-to-noise ratio can be increased effectively.

DETAILED DESCRIPTION OF THE PREFERRED EMBODIMENTS

Figure 1:
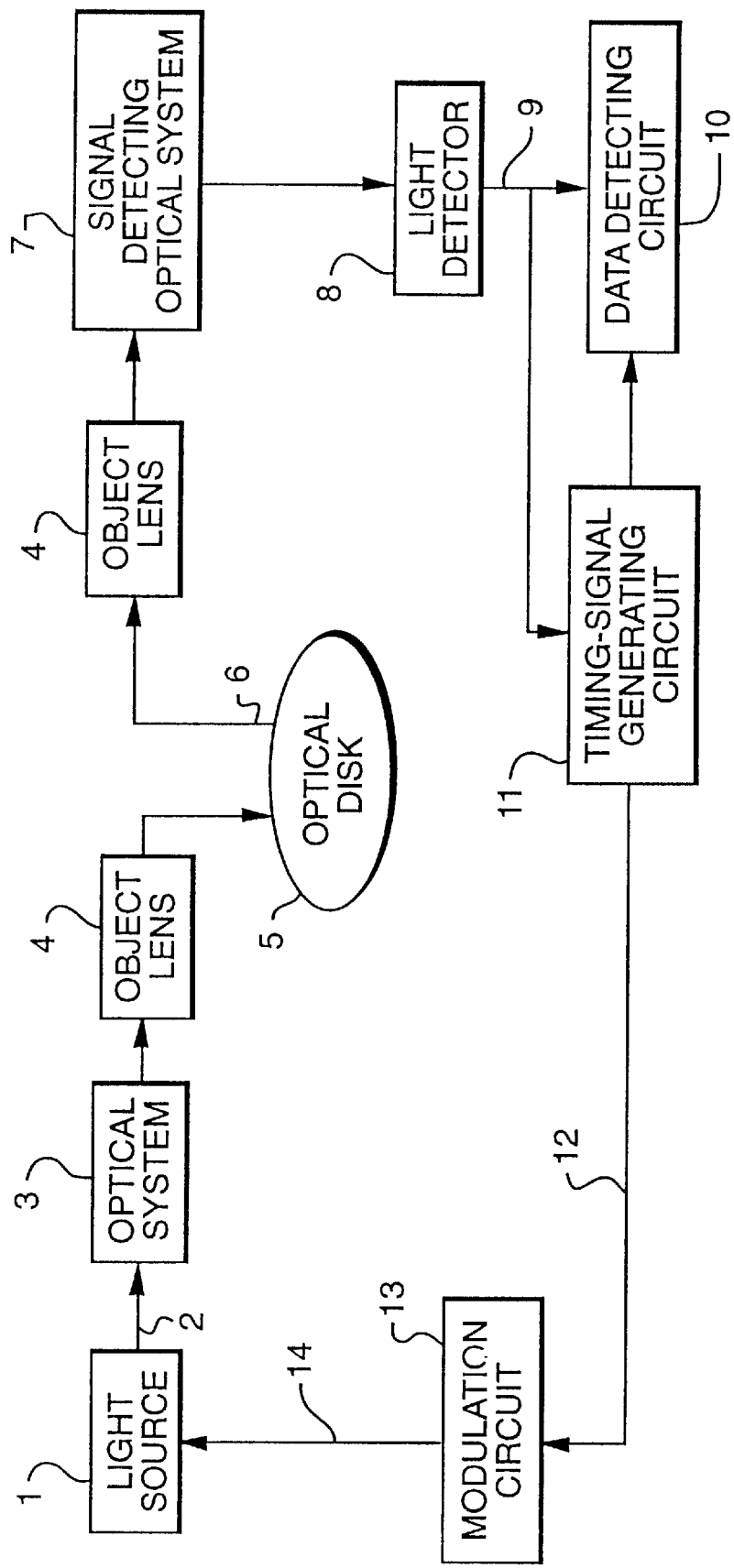
FIG. 1 is a block diagram used for describing an overview of the present invention.

As shown in FIG. 1, a beam 2 coming from a light source 1 is led by an optical system 3 to an objective lens 4, creating a small light spot on the surface of an optical disk 5. The small light spot is positioned on a track where information marks are provided one after another. A reflected light beam 6 is converged by the objective lens 4 and led to a light detector 8 through a signal detecting optical system 7. The intensity of the reflected light beam 6 is converted by the light detector 8 into an electrical signal 9 that conveys information in an optoelectric conversion process.

The electrical signal 9 is supplied to a detection circuit 10 and a timing-signal generating circuit 11 for generating a timing signal 12 synchronized with information marks recorded on the surface of the disk 5. The timing signal 12 is supplied to a modulation circuit 13 for generating a correlation signal 14 which is synchronized with the timing signal 12 and which has a correlation with the information marks. The correlation signal 14 is used for modulating the light source 1.

Recording marks serving as information marks are explained below. Information is stored in gaps between unit marks all having the same shape.

Figure 2:
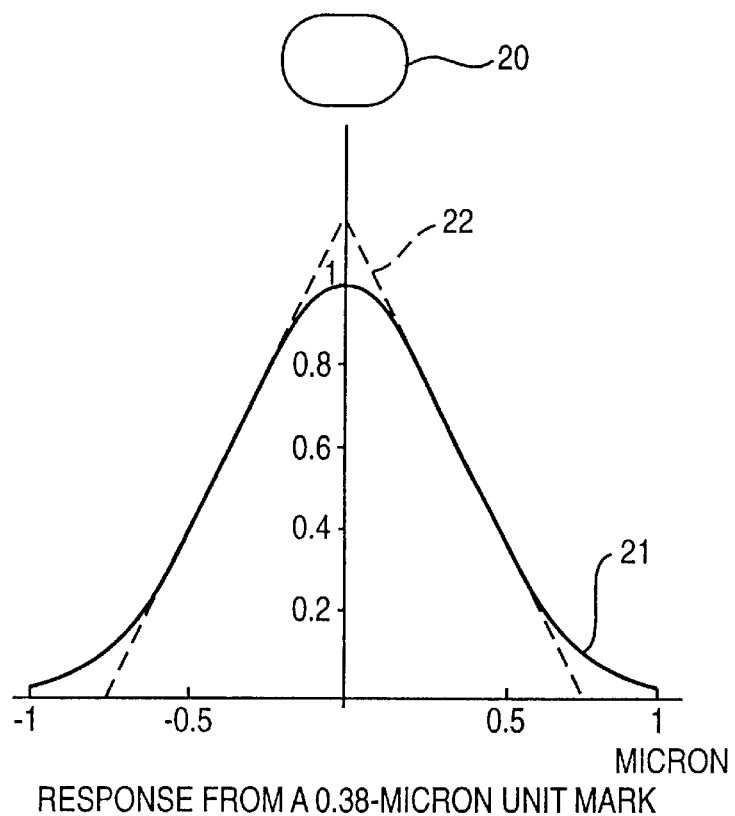
FIG. 2 shows a response waveform generated by irradiating unit marks.

By way of example, the wavelength of the light source is 780 nm, the NA of the optical system is 0.55, and the length of a unit recording mark 20 is 0.38 microns. A response 21 which is generated when a light spot passes through the unit recording mark 20 has a waveform as shown in FIG. 2. In the explanation given below, however, the response is approximated by a triangular waveform 22 shown in the figure.

Let f(t) be a response from a unit mark, g(t) a modulated light-intensity signal produced from the mark, and a(n) modulation data in a gap Tw between unit marks.

$$g(t) = \sum_{n=-\infty}^{n=+\infty} a(n)f(t - nTw) \quad \text{(Eq. 1)}$$

Then, let h(t) be a repetitive waveform expressed as follows:

$$h(t) = \sum_{k=-\infty}^{k=+\infty} f(t - kT) \quad \text{(Eq. 2)}$$

When recording marks are read by a light beam modulated by the repetitive waveform h(t), an integrated signal x(t) is expressed as follows:

$$x(t) = \int_{-\infty}^{+\infty} h(t)g(t)dt \quad \text{(Eq. 3)}$$

Here, it is appropriate to set the range of integration at the repetition period T.

Figure 3:
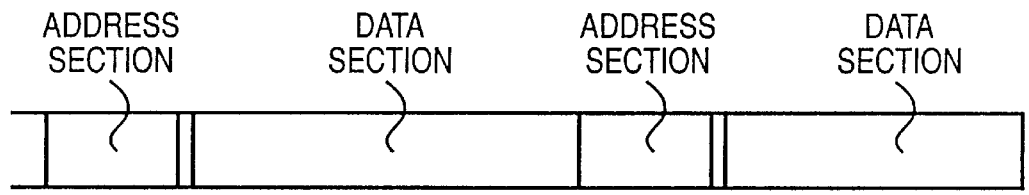
FIG. 3 is a diagram showing a data array on an optical disk.

The actual configuration provided by the present invention is explained in concrete terms as follows. A data array on the optical disk is shown in FIG. 3. A data block comprising an address section previously created on the disk and a data section in which data can be recorded is treated as a processing unit called a sector. A plurality of sectors are provided on concentric tracks to form an array.

In order to record or play back data, a light spot is first positioned on a track. Then, the track is searched for a target sector by playing back the address sections. As the target sector is found, information is recorded in the data section of the target sector or information is played back from the data section thereof.

Typically, the intensity of the light beam is kept constant in a playback operation. Variations in intensity of the reflected signal are detected by detection of the modulated light-intensity signal g(t) produced from the marks. In the case of the conventional optical disk adopting the so-called continuous servo system, data are modulated by a clock signal having a constant frequency before being recorded into the data section during a recording operation. When data are played back from such an optical disk, a self-clocking technique is adopted for extracting a clock signal for demodulating the data from recorded data.

Figure 4:
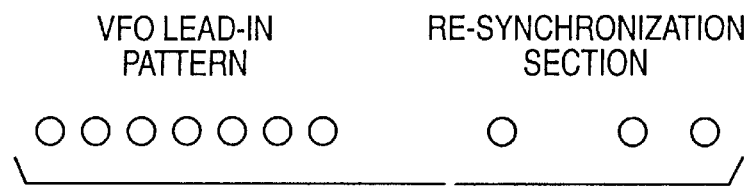
FIG. 4 is a diagram showing an array of synchronization signal marks.
Figure 5A:
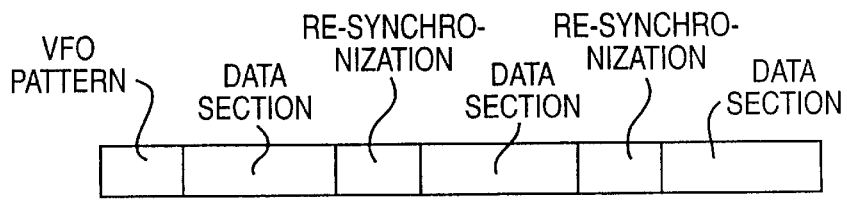
FIGS. 5($a$) through 5($k$) show timing charts of signals generated in an embodiment constructed according to the teachings of the present invention.

In the case of this technique, however, when a data signal is missing due to a defective data section, a voltage-controlled variable frequency oscillator (VFO) for generating the clock signal does not function correctly. For this reason, resynchronization marks for restoring synchronization as shown in FIG. 4 are inserted in the data section at fixed intervals, as shown in FIG. 5(a). The resynchronization marks are also known as resynchronization sections.

Since the resynchronization marks each form a pattern not found in the data section, they can be distinguished from a data signal with ease. In addition, at the beginning of a data section for activating the VFO, a VFO lead-in pattern shown in FIG. 4 is provided as shown in FIG. 5(a).

The present invention provides an optical disk signal processing apparatus which takes compatibility with the conventional continuous servo system into consideration so that the conventional recorded data can also be played back by a circuit block thereof. In other words, the present invention can also be implemented by using the conventional circuit block.

Figure 6:
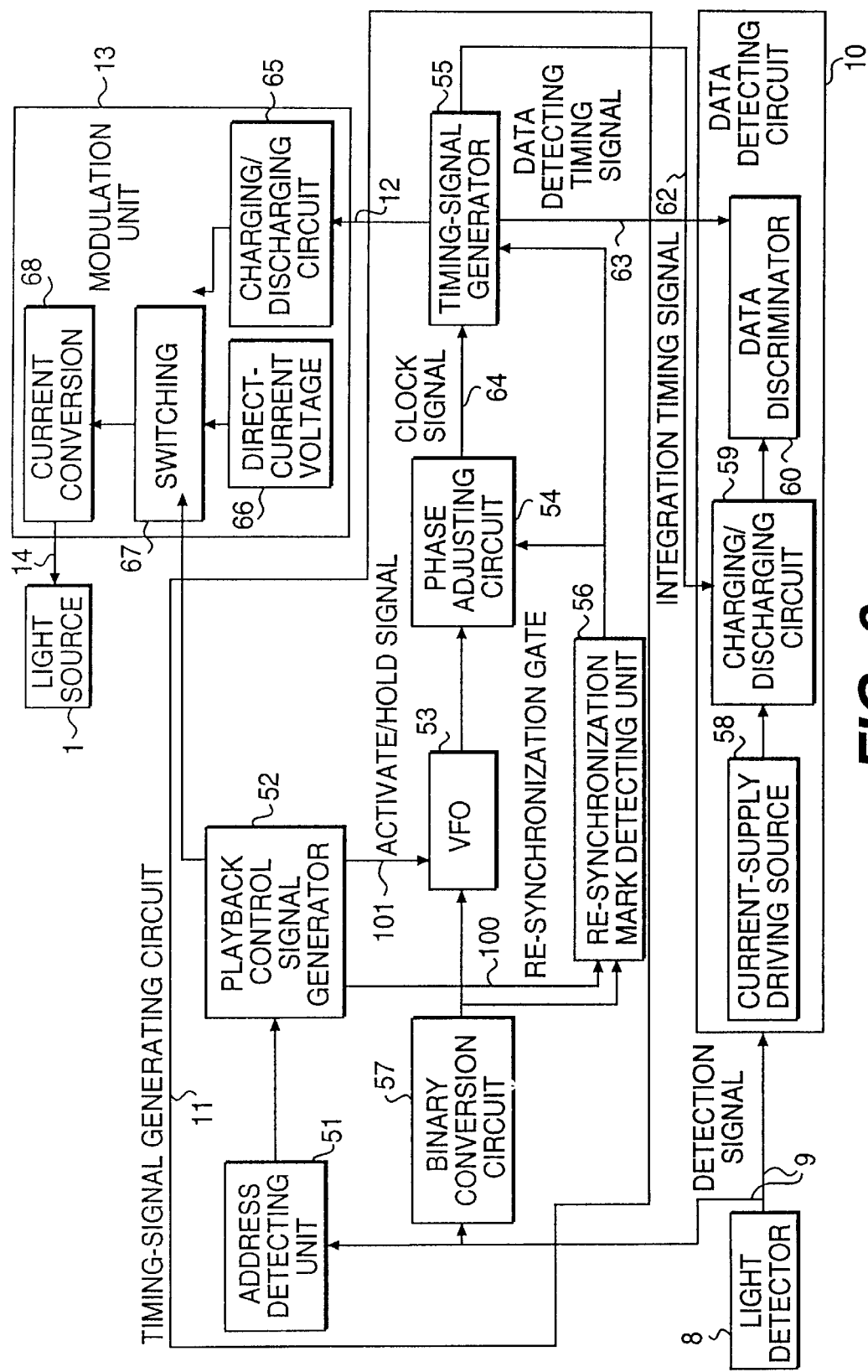
FIG. 6 is a block diagram showing principal components of an embodiment constructed according to the teachings of the present invention.

A method of generating the clock signal is explained by referring to the timing charts of FIGS. 5(a) through 5(k) and to the block diagram of FIG. 6 as follows. Much like the conventional technique, a light beam with a fixed intensity is used for scanning the address sections. While the light beam is scanning the address sections, a signal 9 output by the light detector 8 is supplied to an address detecting circuit 51, which generates an address signal and a timing signal for playing back data, as is also the case with the conventional technique. These signals,are supplied to a playback control signal generator 52 for generating a control signal provided by the present invention.

The playback control signal generator 52 generates a modulation-signal switching signal shown in FIG. 5(c) (FIG. 5(b) shows an actual modulation-signal switching signal based on FIG. 5(c)). The modulation-signal switching signal is used for controlling a modulation signal in such a way that the light source generates a light beam at a fixed intensity level for the address, VFO lead-in, and resynchronization sections, as is the case with the conventional technique. As for the data sections, the intensity of the light beam is modulated by a light-intensity modulating signal to be described later.

The analog detection signal 9 is converted into digital data by a binary conversion circuit 57. The digital data are supplied to the VFO 53 for generating a clock signal. The VFO 53 is activated at the beginning of a VFO lead-in pattern by an activate/hold control signal 101. At the end of the VFO lead-in pattern, the oscillation frequency is held. The clock signal is supplied to a phase adjusting circuit 54 to adjust the phase of the clock signal in accordance with a resynchronization signal detected at each resynchronization section, to produce a phase-adjusted clock signal 64 (FIG. 5(f)). A widely known conventional technique is adopted for the phase adjustment.

The resynchronization signal is generated by a resynchronization mark detecting unit 56 by gating a binary signal supplied thereto by means of a resynchronization detection gate signal 100 generated by the playback control signal generator 52. The clock signal 64 with the phase thereof adjusted is shown in FIG. 5(f). From the fact that the resynchronization signal is synchronized with recorded data, the timing-signal generator 55 can generate a data detection timing signal 63 and a timing signal 12, as well as an integration timing signal 62, for creating a light-intensity modulating signal by using the phase-adjusted clock signal 64 and the resynchronization signal. The data detection timing signal 63 is supplied to a data discriminator circuit 60, the timing signal 12 is supplied to a charging/discharging circuit 65 of the modulation circuit 13, and the integration timing signal 62 is supplied to a charging/discharging circuit 59, as shown in FIG. 6.

The modulation circuit 13 includes the charging/discharging circuit 65, a direct-current voltage supply circuit 66, a switching circuit 67, and a current conversion circuit 68. The modulation circuit 13 provides a signal 14 for modulating the output intensity of the light source 1 in synchronism with the timing signal 12, which is generated in correlation with the data detection timing signal 63.

The actual timing signals are shown in FIG. 5 in terms of their relation with recording (information) marks (FIG.

5(*d*)). A charging/discharging switching signal having the same period as the recording mark period is generated from the phase-adjusted clock signal 64 in synchronism with the resynchronization marks as shown in FIG. 5(*g*). A charging start signal having a period two times the recording-mark period is further generated in synchronism with the leading edges of marks as shown in FIG. 5(*h*). In addition, a discharging end signal having a period two times the recording-mark period is further generated in synchronism with the trailing edges of marks as shown in FIG. 5(*i*). These signals are used for controlling a charging/discharging circuit 65 in order to generate light-intensity modulating signal having the waveform shown in FIG. 5(*j*). Here, waveforms right after the modulation is shown and the direct-current level is the level of the conventional playback signal.

In the detection circuit 10, the detection signal 9 g(t) modulated by the modulation signal a(n) described earlier is supplied to a current-supply driving circuit 58 to control the magnitude of a current which is in turn used for driving the charging/discharging circuit 59. Controlled by the integration timing signal 62, the waveform of which is shown in FIG. 5(*k*), the charging/discharging circuit 59 accumulates an electric charge provided by the current supplied thereto, or discharges and resets itself. The charging/discharging circuit 59 thus outputs an integrated signal to the data discriminator 60.

The current-supply driving circuit 58, charging/discharging circuit 59, and data discriminator 60 are conventional. However, the integration timing signal 62 has not been supplied to the charging/discharging circuit 59 in the known apparatus, to integrate the detection signal only during the period of the modulation waveform shown in FIG. 5(*j*).

More particularly, a charging operation is started on the rising edge of the integration timing signal 62, and the accumulated electrical charge is rapidly discharged on the trailing edge thereof. In this way, the detection signal is integrated only during the period of the modulation waveform shown in FIG. 5(*j*). The data detection timing coincides with the trailing edge of the integration timing signal (that is, the timing with which an integration value is obtained).

The embodiment described above is an example of the mark position recording system. At the present time, a mark gap recording system whereby information is held on mark edges is being studied. The code of 1–7 modulation is adopted as a modulation code. With this code, a continuous array of marks always comprises two or more unit marks and, thus, no isolated mark exists. The number of unit marks in the continuous array is not greater than 8. Likewise, the length of the gap also has a limit.

Figure 7:
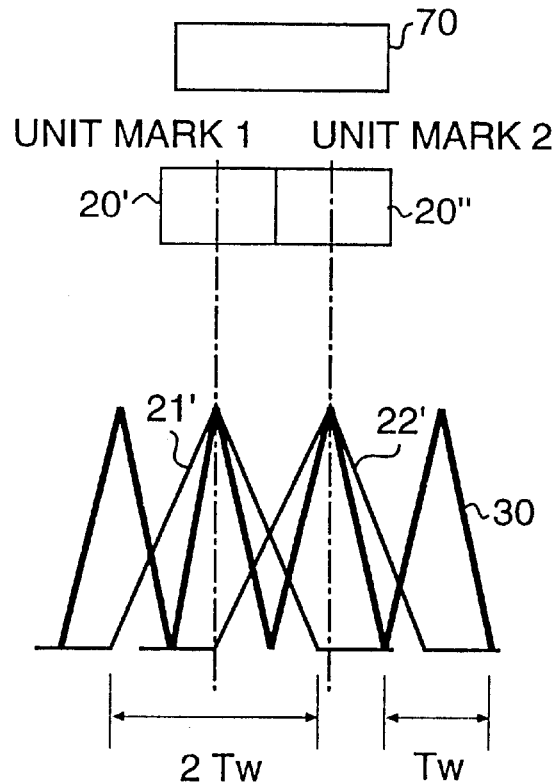
FIG. 7 is an explanatory diagram showing a mark array of 1–7 modulation and a detection signal provided by the present invention for the array.
Figure 8:
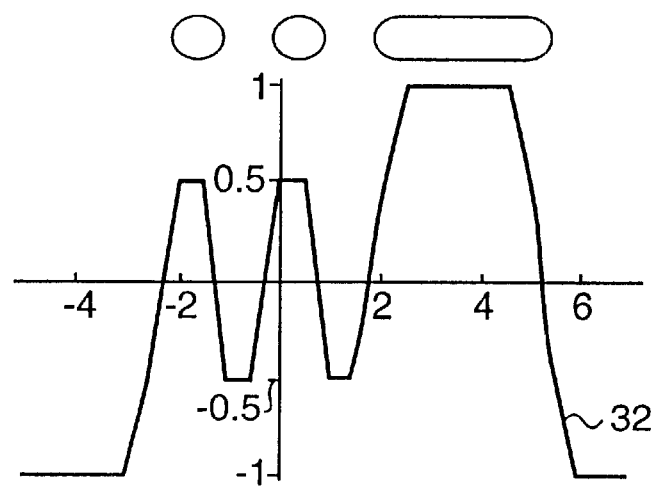
FIG. 8 is an explanatory diagram showing a mark array of 1–7 modulation and a detection signal of a conventional system for the array.

For mark arrays shown in FIG. 8, a read waveform 32 is obtained. A signal for a mark 70 comprising 2 unit marks 20' and 20" is generated by superposition of responses from the unit marks 20' and 20", as shown in FIG. 7. However, the superposition results in no pause period, so that the repetitive waveform and the integration technique described above cannot be adopted. In order to solve this problem, the light source 1 is modulated by a repetitive waveform 30 having a period equal in length to the unit mark Tw, and the detection signal is integrated for each repetitive period Tw of the repetitive waveform 30. In this way, the same processing as that of the embodiment described above can be implemented.

According to the present invention, by taking the time correlation of a repetitive waveform synchronized with the responses from the recording marks, the signal-to-noise ratio can be increased. In addition, by increasing the intensity of the repetitive waveform, the signal-to-noise ratio can be further improved.

Although the invention has been described in conjunction with preferred and exemplary features and embodiments thereof, the person of ordinary skill in the art to which the invention pertains will readily conceive modifications upon reading and understanding the foregoing description. All such modifications that basically rely on the teachings through which the invention has advanced the state of the art are properly considered within the spirit and scope of the invention.

We claim:

1. A signal processing method for reading data from a rotating disk, comprising the steps of:

radiating a playback light beam through an optical system to said rotating disk from a light source, wherein an intensity of said playback light beam changes during said radiating step according to signals recorded on said rotating disk; and detecting light reflected by said rotating disk through a signal detecting optical system.

2. A signal processing method for reading data from a rotating disk, comprising the steps of:

radiating a playback light beam through an optical system to said rotating disk from a light source, wherein an intensity of said playback light beam changes during said radiating step in correspondence with a clock pulse generated from signals recorded on said rotating disk; and detecting light reflected by said rotating disk through a signal detecting optical system.

3. A signal processing method for reading data from a rotating disk, comprising the steps of:

radiating a playback light beam through an optical system to said rotating disk from a light source, wherein an intensity of said playback light beam changes during said radiating step in accordance with a timing of a clock pulse generated from signals recorded on said rotating disk; and detecting light reflected by said rotating disk through a signal detecting optical system.

4. A signal processing method for reading data from a rotating disk, comprising the steps of:

radiating a playback light beam through an optical system to said rotating disk from a light source, wherein an intensity of said playback light beam changes during said radiating step in correspondence with a clock pulse generated from a synchronization signal recorded on said rotating disk; and detecting light reflected by said rotating disk through a signal detecting optical system.

* * * * *